US011887579B1

(12) United States Patent
Chang et al.

(10) Patent No.: US 11,887,579 B1
(45) Date of Patent: Jan. 30, 2024

(54) SYNTHETIC UTTERANCE GENERATION

(71) Applicant: Intuit Inc., Mountain View, CA (US)

(72) Inventors: Jianxiang Chang, Mountain View, CA (US); Sayan Paul, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/955,412

(22) Filed: Sep. 28, 2022

(51) Int. Cl.
*G10L 13/02* (2013.01)

(52) U.S. Cl.
CPC .................................... *G10L 13/02* (2013.01)

(58) Field of Classification Search
CPC .............................. G10L 13/02; G10L 13/047
See application file for complete search history.

(56) References Cited

U.S. PATENT DOCUMENTS

| | | | | |
|---|---|---|---|---|
| 5,796,916 | A | 8/1998 | Meredith | |
| 8,972,408 | B1 | 3/2015 | Carpio et al. | |
| 10,467,122 | B1 | 11/2019 | Doyle | |
| 10,528,329 | B1 | 1/2020 | Doyle | |
| 10,796,084 | B2 | 10/2020 | Wang et al. | |
| 10,943,581 | B2 | 3/2021 | Bromand | |
| 11,250,033 | B2 | 2/2022 | Doyle | |
| 2011/0153309 | A1 | 6/2011 | Kim et al. | |
| 2017/0301340 | A1* | 10/2017 | Yassa | G10L 13/047 |
| 2020/0380952 | A1* | 12/2020 | Zhang | G10L 13/08 |
| 2022/0050864 | A1 | 2/2022 | Osmon et al. | |
| 2022/0084510 | A1 | 3/2022 | Peng et al. | |
| 2022/0148562 | A1* | 5/2022 | Park | G10L 13/047 |

(Continued)

FOREIGN PATENT DOCUMENTS

| | | | | |
|---|---|---|---|---|
| CN | 111916052 A | * 11/2020 | | G10L 13/02 |
| CN | 112116903 A | * 12/2020 | | G10L 13/02 |
| CN | 112289299 A | * 1/2021 | | G10L 13/02 |

(Continued)

OTHER PUBLICATIONS

Damodaran, Prithiviraj, "Parrot Paraphraser", retrieved from the Internet on Aug. 10, 2022 at [https://github.com/PrithivirajDamodaran/Parrot_Paraphraser] 11 pages.

(Continued)

*Primary Examiner* — Mohammad K Islam
(74) *Attorney, Agent, or Firm* — Paradice & Li LLP

(57) ABSTRACT

This disclosure relates to generating a comprehensive set of synthetic utterances. An example system is configured to provide an input utterance to a plurality of synthetic utterance generation pipelines in parallel. Each of the plurality of synthetic utterance generation pipelines include one or more utterance synthesizers. For example, one or more pipelines may use a synthesizer chain that includes a plurality of synthesizers in parallel. The plurality of synthetic utterance generation pipelines generates synthetic utterances, which may be stored in a database after evaluating the similarity between the original input utterance and each resulting synthetic utterance. For example, a synthetic utterance may be retained if the cosine similarity between the input and synthetic utterances is less than a predetermined threshold. Additionally, the synthetic utterances may be fed back at input utterances based on the similarity evaluation and the feedback loop repeated until a desired number of utterances are generated.

18 Claims, 4 Drawing Sheets

(56) References Cited

U.S. PATENT DOCUMENTS

2022/0208172 A1* 6/2022 Polonov .................. G10L 15/04

FOREIGN PATENT DOCUMENTS

| | | | | | |
|---|---|---|---|---|---|
| CN | 108417217 | B | | 7/2021 | |
| CN | 114765026 | A | * | 7/2022 | G10L 13/02 |
| WO | WO-2020110808 | A1 | * | 6/2020 | G06F 40/58 |

OTHER PUBLICATIONS

Siow, Eugene, “Bart-Paraphrase”, retrieved from the Internet on Aug. 10, 2022 at [https://huggingface.co/eugenesiow/bart-paraphrase] 5 pages.

“Quora”, retrieved from the Internet on Aug. 10, 2022 at [https://huggingface.co/datasets/quora] 6 pages.

* cited by examiner

SYNTHETIC UTTERANCE GENERATION

TECHNICAL FIELD

This disclosure relates generally to systems for synthetic data generation, and in particular to techniques and systems for synthetic utterance generation.

DESCRIPTION OF RELATED ART

Machine learning is a form of artificial intelligence that uses algorithms to use historical data as input to predict new output values. Machine learning, for example, may be used in a wide variety of tasks, including natural language processing, financial analysis, image processing, generating recommendations, spam filtering, fraud detection, malware threat detection, business process automation (BPA), etc. In general, machine learning uses training examples to train a model to map inputs to outputs. Once trained, a machine learning model may be used to accurately predict outcomes from new, previously unseen data.

There are technical challenges related to training and testing machine learning models. For example, the efficacy of a machine learning model is proportional to the size of the dataset used to train and test the machine learning model. If trained and tested using a small dataset, a machine learning model will be less powerful and less accurate than a machine learning model trained with a large dataset. Acquiring a large training set, however, may be difficult, time consuming, and expensive. For example, training sets may be acquired by obtaining and labeling natural occurrences of the desired dataset. Identifying and labeling natural occurrences of the dataset, however, may be labor intensive and may result in a small sample size. Training sets also may be generated synthetically, e.g., generated by machine. Synthetically generated datasets may be used in place of or in addition to natural occurring training sets. Generation of training sets synthetically, however, may also be time consuming and expensive, particularly when the training set is large.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable features disclosed herein.

One innovative aspect of the subject matter described in this disclosure can be implemented as a computer-implemented method for generating synthetic utterances. An example method includes providing an utterance as a first input utterance to a plurality of synthetic utterance generation pipelines, each of the plurality of synthetic utterance generation pipelines comprising one or more synthesizers. The method includes generating, with the plurality of synthetic utterance generation pipelines, a plurality of synthetic utterances based on the first input utterance, and storing the plurality of synthetic utterances.

Another innovative aspect of the subject matter described in this disclosure can be implemented as a system for generating synthetic utterances. An example system includes one or more processors; and a memory coupled to the one or more processors and storing instructions that, when executed by the one or more processors, cause the system to perform operations. The operations include providing an utterance as a first input utterance to a plurality of synthetic utterance generation pipelines, each of the plurality of synthetic utterance generation pipelines comprising one or more synthesizers. The operations further include generating, with the plurality of synthetic utterance generation pipelines, a plurality of synthetic utterances based on the first input utterance, and storing the plurality of synthetic utterances.

In some implementations, a similarity between the first input utterance and each synthetic utterance produced by each of the plurality of synthetic utterance generation pipelines may be evaluated, wherein each synthetic utterance is stored if the similarity is less than a predetermined threshold.

In some implementations, a similarity between the first input utterance and each synthetic utterance produced by each of the plurality of synthetic utterance generation pipelines may be evaluated, wherein each synthetic utterance is provided as a new input utterance to one or more of the synthetic utterance generation pipelines if the similarity is less than the predetermined threshold.

In some implementations, at least one of the synthetic utterance generation pipelines includes a plurality of different synthesizers coupled in series.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
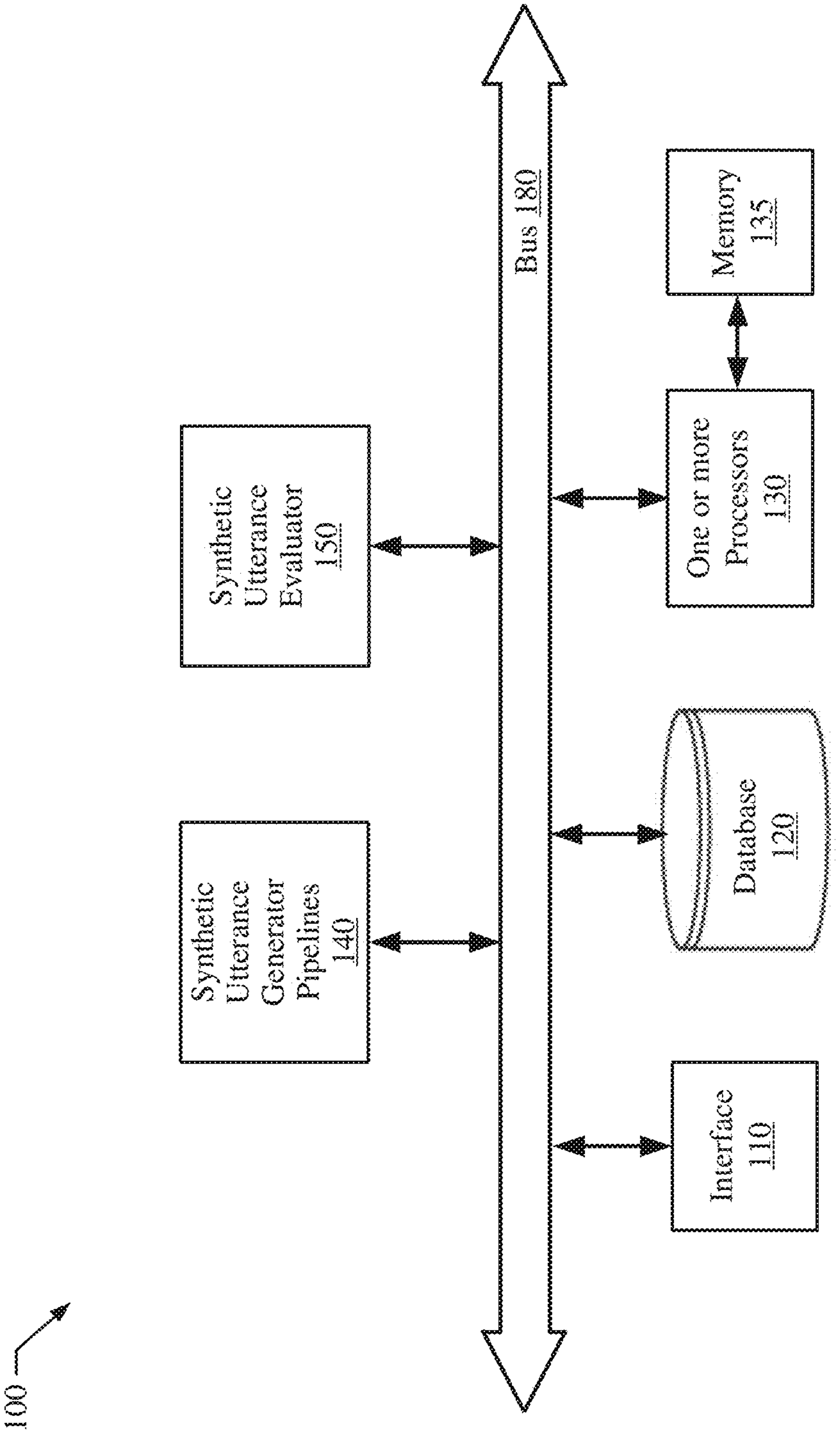
FIG. 1 shows a block diagram of a system to generate synthetic utterances, according to some implementations.

The following description is directed to certain implementations for synthetic generation of datasets, and in particular to synthetic generation of utterances, such as an uninterrupted chain of spoken or written language. The synthetically generated utterances, for example, may be used as a training set of machine learning models. It may be readily understood that certain aspects of the disclosed systems and methods can be arranged and combined in a wide variety of different configurations, applications, and use cases, all of which are contemplated herein.

Some systems use natural language processing to infer information from natural language, i.e., language originating from a human, which may be used for a particular task. For example, processing systems may use natural language processing for tasks such as automatically generating recommendations, fraud detection, automatic customer support, etc. The processing system, for example, may be trained to understand user utterances and to provide relevant information, such as a recommendation or assistance in response. In other examples, user utterances may be processed to detect instances of malicious behavior, such as fraud or non-compliance with guidelines. A well trained system is critical for many applications, e.g., to provide a good customer experience or to detect malicious behavior. As an example, some malicious behavior such as fraud, including improperly soliciting sensitive information, e.g., social security numbers, credit card numbers, banking information, or attempting to poach customers, may be a rare occurrence, but may have great consequences. Accordingly, accurately identifying such behavior may be particularly critical.

Systems using natural language processing typically use machine learning models. During training of a machine learning model, e.g., supervised or unsupervised learning, the system is provided training samples in the form of utterances, which may include particular content that the system is being trained to recognize. Using the training samples, system parameters may be modified, e.g. weights in a neural network, probabilities in a hidden-Markov model, etc., to affect the output provided by the system. Prior to deployment, a trained system is typically tested with additional samples, e.g., to test the accuracy of the system. The performance of the trained system is directly correlated to the training samples used to train and test the system. Ideally, the training sample size is large and diverse. Accordingly, it is important to acquire a sufficient amount of training samples to robustly train and test a natural language processing system.

Acquiring training samples for natural language processing such as utterances (which may be the written or spoken statements or clauses made by persons), however, may be time consuming and expensive. Moreover, in some instances, such as with fraud detection, there may be limited examples of naturally occurring utterances. Accordingly, the use of naturally occurring utterances in such cases produces a sparce dataset that may be inadequate to train a system in a meaningful way. Without a large and diverse training sample, the resulting natural language processing system will likely exhibit poor performance and may miss critical occurrences of a behavior or may reduce user experience. Further, a poorly trained system may waste a significant amount of computing resources, such as CPU and GPU cycles and RAM, by producing incorrect results.

The disclosed implementations provide an approach to synthetically generating utterances, which may be used, e.g. as training examples for training a natural language processing system. As used herein, "synthetic" refers to being at least partly machine-generated. The framework discussed herein may be used to produce a comprehensive set of synthetically generated utterances in large quantities at a relatively low cost.

For example, in some implementations, synthetic utterances may be generated using a framework that includes a plurality of parallel synthetic utterance generation pipelines, each of which receives the same utterance as an input utterance. Each of the plurality of synthetic utterance generation pipelines may include one or more synthesizers. The synthesizers, for example, may be Text2Text machine learning (ML) models. In some implementations, at least one of the synthetic utterance generation pipelines may include a synthesizer chain, e.g., synthesizer chained together in series, e.g., with the output of one synthesizer being provided as the input of a subsequent synthesizer. The plurality of synthetic utterance generation pipelines each produce a synthetic utterance based on the input utterance, which may be stored in a dataset. In some implementations, prior to storage, each synthetic utterance may be evaluated to ensure that it is useful. For example, the synthetic utterance may be compared to the input utterance and may be retained, e.g., stored, only if the similarity is sufficiently close. Additionally, the synthetic utterances may be fed back as input utterances to the plurality of synthetic utterance generation pipelines, e.g., in a feedback loop, which may be repeated until a desired number of synthetic utterances are produced.

In this manner, a system automates generation of a high quality synthetic utterances in large quantity in a fast and efficient manner. The resulting comprehensive labeled set of utterances contain the same contextual meaning as the original input utterance but are expressed in different syntax, and are efficiently produced in sufficient quantities to support training accurate and effective machine learning models in a manner that is not possible using a sparse dataset produced using conventional techniques. Therefore, implementations of the subject matter disclosed herein are not an abstract idea such as organizing human activity or a mental process that can be performed in the human mind, for example, because it is not practical, if even possible, for a human mind to generate synthetic utterances as described herein.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions. However, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems and devices may include components other than those shown, including well-known components such as a processor, memory, and the like.

Several aspects of synthetic utterance generation will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a block diagram of a system 100 configured to generate synthetic utterances, according to some implementations. The system 100 is shown to include an input/output (I/O) interface 110, a database 120, one or more processors 130, a memory 135 coupled to the one or more processors 130, synthetic utterance generation pipelines 140, and a data bus 180. In some implementations, the system 100 also includes a synthetic utterance evaluator 150. The various components of the system 100 may be connected to one another by the data bus 180, as depicted in the example of FIG. 1. In other implementations, the various components of the system 100 may be connected to one another using other suitable signal routing resources.

The interface 110 may include any suitable devices or components to obtain information (such as input data) to the system 100 and/or to provide information (such as output data) from the system 100. In some instances, the interface 110 may include a display and an input device (such as a mouse and keyboard) that allows a person to interface with the system 100 in a convenient manner. For example, the interface 110 may enable a user to interface with the synthetic utterance generation pipelines 140, for example, to provide natural language utterances to be processed by the synthetic utterance generation pipelines 140 and synthetic utterance evaluator 150. Additionally or alternatively, the interface 110 may include an ethernet port, wireless interface, or other means to communicate with one or more other devices via wires or wirelessly. In some implementations, the system 100 may host an application for training a natural language processing system using the synthetically generated utterances.

The synthetic utterance generation pipelines 140 and synthetic utterance evaluator 150 may be implemented as one or more special purpose processors, which may be implemented separately or as part of the one or more processors 130. For example, the one or more processors 130 may execute instructions stored in memory 135, which configure the one or more processors 130 to perform one or more functions described herein. In the context of this particular specification, the one or more processors 130 may be a general purpose computer that once programmed pursuant to instructions stored in memory operates as a special purpose computer. The synthetic utterance generation pipelines 140 and synthetic utterance evaluator 150 are illustrated separately from the one or more processors 130 for clarity.

Figure 2:
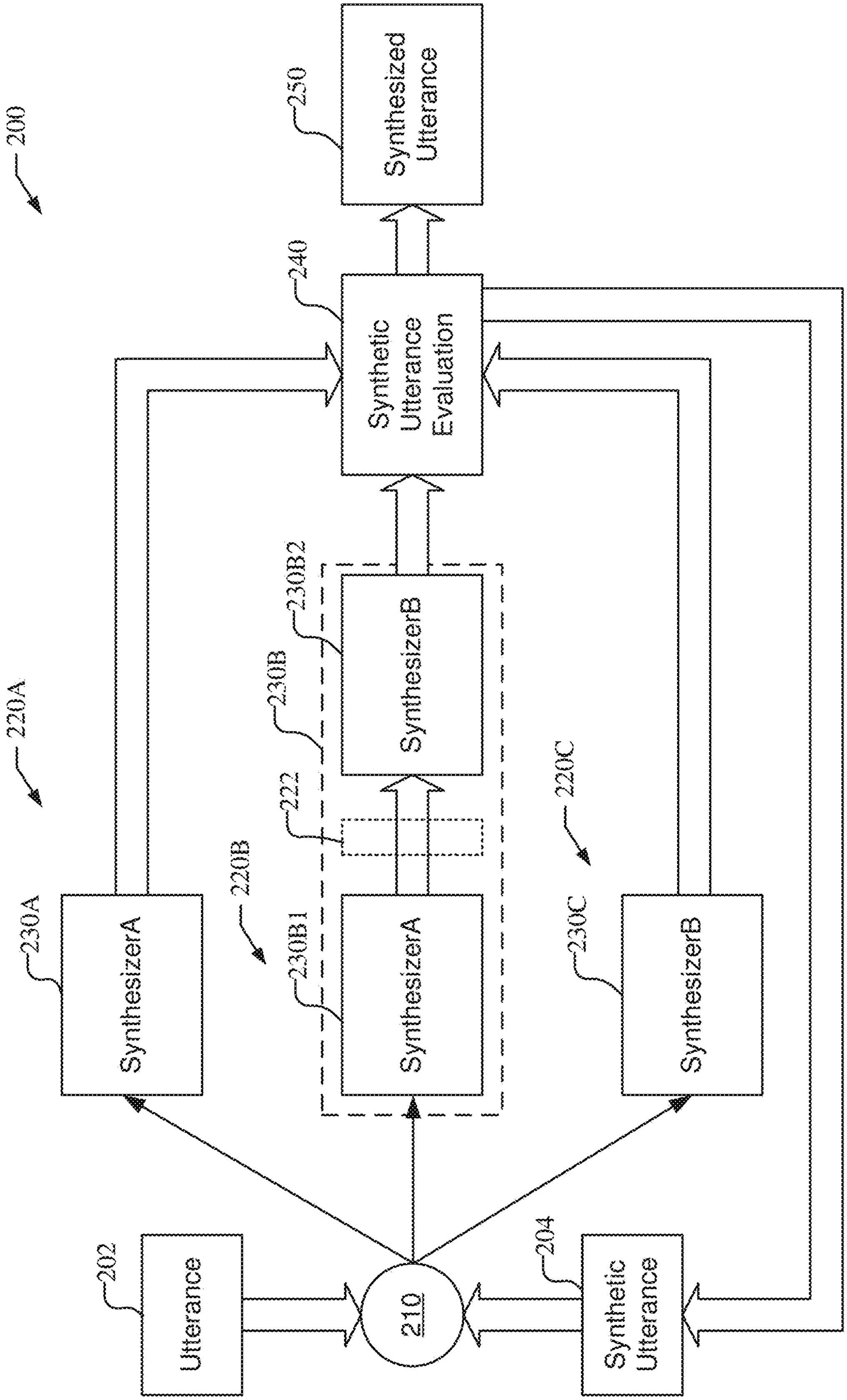
FIG. 2 shows an illustrative architecture of a framework for synthetic utterance generation, according to some implementations.

FIG. 2 illustrates an illustrative architecture of a framework 200 for synthetic utterance generation, according to some implementations. The framework 200, for example, may be implemented by the system 100 using synthetic utterance generation pipelines 140, the synthetic utterance evaluator 150, and database 120.

As illustrated, an utterance 202, which may be provided to the system 100, shown in FIG. 1, via the interface 110, is provided as an input utterance 210 to a plurality of synthetic utterance generation pipelines 220A, 220B, and 220C (sometimes collectively referred to as synthetic utterance generation pipelines 220). The synthetic utterance generation pipelines 220, for example, may be performed by the synthetic utterance generation pipelines 140 illustrated in FIG. 1. The utterance 202, for example, may be a natural language utterance, e.g., originating from a human.

Each synthetic utterance generation pipeline 220 receives the input utterance 210 and generates and outputs a synthetic utterance. The synthetic utterances produced by each synthetic utterance generation pipeline 220 may be stored in a synthesized utterance database 250, e.g., in database 120 in system 100, and may be labeled based on the label associated with the input utterance 210. In some implementations, the synthetic utterances are provided to synthetic utterance evaluation 240, which determines whether the synthetic utterances are good from a linguistic perspective, i.e., contain the same contextual meaning but expressed in different syntax. The synthetic utterance evaluation 240, for example, may be the performed by the synthetic utterance evaluator 150, illustrated in FIG. 1. If a synthetic utterance is determined to be good, as determined by the synthetic utterance evaluation 240, the synthetic utterance may be stored in the synthesized utterance database 250 and, otherwise, may be rejected. Additionally, in some implementations, if a synthetic utterance is determined to be good by the synthetic utterance evaluation 240, the synthetic utterance is provided as synthetic utterance 204 in a feedback loop and is used as another input utterance 210 to the synthetic utterance generation pipelines 220. In some implementations, the feedback loop may continue with newly generated synthetic utterances until none of the synthetic utterance generation pipelines 220 output a good synthetic utterance as determined by the synthetic utterance evaluation 240 (at which time a new utterance 202 may be provided as an input utterance 210) or a predetermined number of synthetic utterances have been produced.

As illustrated, each synthetic utterance generation pipeline 220 includes one or more synthesizers. For example, pipeline 220A is illustrated as including synthesizer 230A, pipeline 220C is illustrated as including synthesizer 230C, and pipeline 220B is illustrated including a synthesizer chain 230B, including synthesizer 230B1 and synthesizer 230B2 coupled together in series. Synthesizers 230A, 230B1, 230B2, and 230C are sometimes collectively referred to as synthesizers 230. The framework 200 is scalable to accommodate additional synthetic utterance generation pipelines and/or to accommodate additional or different synthesizers within each synthetic utterance generation pipeline.

Each synthesizer 230, for example, may be one or more Text2Text natural language processing (NLP) models, which generate a synthetic utterance based on the input utterance 210. For example, as illustrated in FIG. 2, synthesizers 230A and 230B1 may be a first type of synthesizer (labeled synthesizerA) and synthesizers 230B2 and 230C may be a second (different) type of synthesizer (labeled synthesizerB). More than two types of synthesizers may be used in the synthetic utterance generation pipeline 220. The synthesizers 230, for example may be based on T5 or T5X Text-To-Text Transfer Transformers produced by Google, paraphraser generation models, Marion framework for training, a Q&A (Question and Answer) based model, or any other model. By way of example, a synthesizer that may be used in the synthetic utterance generation pipelines 220 is Parrot paraphraser, which may be fine-tuned on datasets including Google PAWS (Paraphrase Adversaries from Word Scrambling), MSRP (Microsoft Research Paraphrase), Quora QA, and is based on Google's T5 model. Another example of a synthesizer that may be used in the synthetic utterance generation pipelines 220 is Quora QA paraphraser, which may be fine-tuned on datasets such as Quora question pair dataset, and is likewise based on Google's T5 model. Another example of a synthesizer that may be used in the synthetic utterance generation pipelines 220 may be a translation pipeline that is based on Marion framework for training and is trained using an OPUS dataset, and may be used to translate an utterance to a plurality of languages before returning to the original language (e.g., from English to French to Spanish to English). It should be understood that additional or different types of synthesizers may be used and that the framework 200 is configurable to include different types of synthesizers.

Synthesizers using different machine learning models have different strengths and weaknesses in synthetic utterance creation. Accordingly, through use of a plurality of synthetic utterance generation pipelines 220 operating in parallel in the framework 200 and the synthetic utterance evaluation 240, the strengths of the synthesizers may be exploited and weaknesses minimized, e.g., by generating a plurality of synthetic utterances at the same time and retaining only those that are deemed useful, e.g., contain the same contextual meaning but are expressed in different syntax.

Moreover, by chaining synthesizers together in series, e.g., as illustrated by synthesizer 230B1 and 230B2 in synthetic utterance generation pipeline 220B, a more comprehensive set of synthetic utterances may be produced. For example, the synthesizer 230B1 and 230B2 may be a translation based Text2Text model chained with a Q&A based model, respectively, which may create a larger variety of synthetic utterances than if the translation based Text2Text model and the Q&A based model are used individually in separate synthetic utterance generation pipelines. In some implementations, the synthesizer chain 230B may include a translator 222 (shown with dotted lines) between synthesizer 230B1 and synthesizer 230B21. The translator 222, for example, may receive the output synthetic utterance from a previous synthesizer model (e.g., from synthesizer 230B1) and may preprocess the synthetic utterance (e.g., such filtering out synthetic utterances that exceed a similarity threshold to the original utterance) before feeding it to the next synthesizer model (e.g., to synthesizer 230B2) as an input utterance.

The synthetic utterance evaluation 240 may evaluate each synthetic utterance to determine if it is a valid utterance, e.g., linguistically correct and includes the same information as the input utterance. The synthetic utterance evaluation 240, for example, may evaluate the similarity between the input utterance 210 to the synthetic utterance generation pipeline 220 and the resulting synthetic utterance output by the synthetic utterance generation pipeline 220. In some implementations, the similarity check may be relative to the original utterance 202, while in other implementations, the similarity check may be relative to last input utterance (which may be synthetic utterance 204) which produced the resulting synthetic utterance.

The similarity between the input utterance and the synthetic utterance, for example, may be determined based on measuring the cosine similarity of the two utterances. For example, the original utterance and the output synthetic utterance may be encoded into two separate high dimension vectors, e.g., using techniques such as word vectors aggregation, topic modeling, recurrent models, Bag of Words (BOW), Bag of N-Grams, BERT (Bidirectional Encoder Representations from Transformers), sentence BERT (SBERT), InferSent, Universal Sentence Encoder, etc. The cosine distance between the two resulting vectors is then determined. A small cosine distance between vectors corresponds to greater similarity between the original utterance and the output synthetic utterance. Thus, the resulting cosine distance between the two resulting vectors may be compared to a predetermined threshold, and a cosine distance less than the predetermined threshold may be used to indicate that the synthetic utterance is good from a linguistic perspective, i.e., contains the same contextual meaning, and may be used for model training. Accordingly, if the resulting cosine distance is less than the predetermined threshold, the synthetic utterance may be stored in the synthesized utterance database 250 and labeled per the original input utterance. Additionally, if the cosine distance is less than the predetermined threshold (or a different predetermined threshold), the synthetic utterance may be provided in a feedback loop (synthetic utterance 204) to create more synthetic utterances, which may be similarly labeled, stored, and fed back as input utterances, if determined to be similar by the synthetic utterance evaluation 240. The predetermined threshold(s) used for evaluating each synthetic utterance may be selected, e.g., based on the amount of synthesized utterances desired and the diversity in the utterances desired.

In some implementations, a synthetic utterance 204 provided by one synthetic utterance generation pipeline 220 may be provided as an input utterance 210 for each of the plurality of synthetic utterance generation pipelines 220 or to only the non-originating synthetic utterance generation pipelines 220. For example, if synthetic utterance generation pipeline 220C produces synthetic utterance 204, it may be used as an input utterance 210 for all synthetic utterance generation pipelines 220 or for only synthetic utterance generation pipelines 220A and 220B.

The feedback loop using synthetic utterances may continue until the synthetized utterance count reaches a predetermined count threshold or until the synthetic utterance generation pipelines 220 no longer produce good synthetic utterances. If no good synthetic utterances are produced by the synthetic utterance generation pipelines 220 before the count threshold is reached, a new natural language utterance 202 may be provided as the input utterance 210 and the process is repeated. Accordingly, a comprehensive labeled set of utterances given the same context expressed in different ways may be quickly generated.

By way of example, assuming the original utterance may be designated as A, it has a specific contextual meaning and is expressed in a certain way after certain embedding, which may be designated as $[a_i]$. The framework 200 may be used to produce a set $\{A'_i\}$, where each $A'_i$ has a similar contextual meaning as A but is expressed in a different way, designated as $[a'_i]$ after the same embedding. The greater the variety of $[a'_i]$, the more comprehensive the set $\{A'_i\}$ will be. The cosine distance used by the synthetic utterance evaluation 240 may be used to measuring the variation between $[a'_i]$ and $[a_i]$, and to ensure that the contextual meaning is similar, but that a wide variety of $[a'_i]$ is included in the set $\{A'_i\}$. By ensuring there is a large variety of $[a'_i]$ in the set $\{A'_i\}$, a comprehensive labeled set of utterances suitable for training a robust NLP model may be developed.

Figure 3:
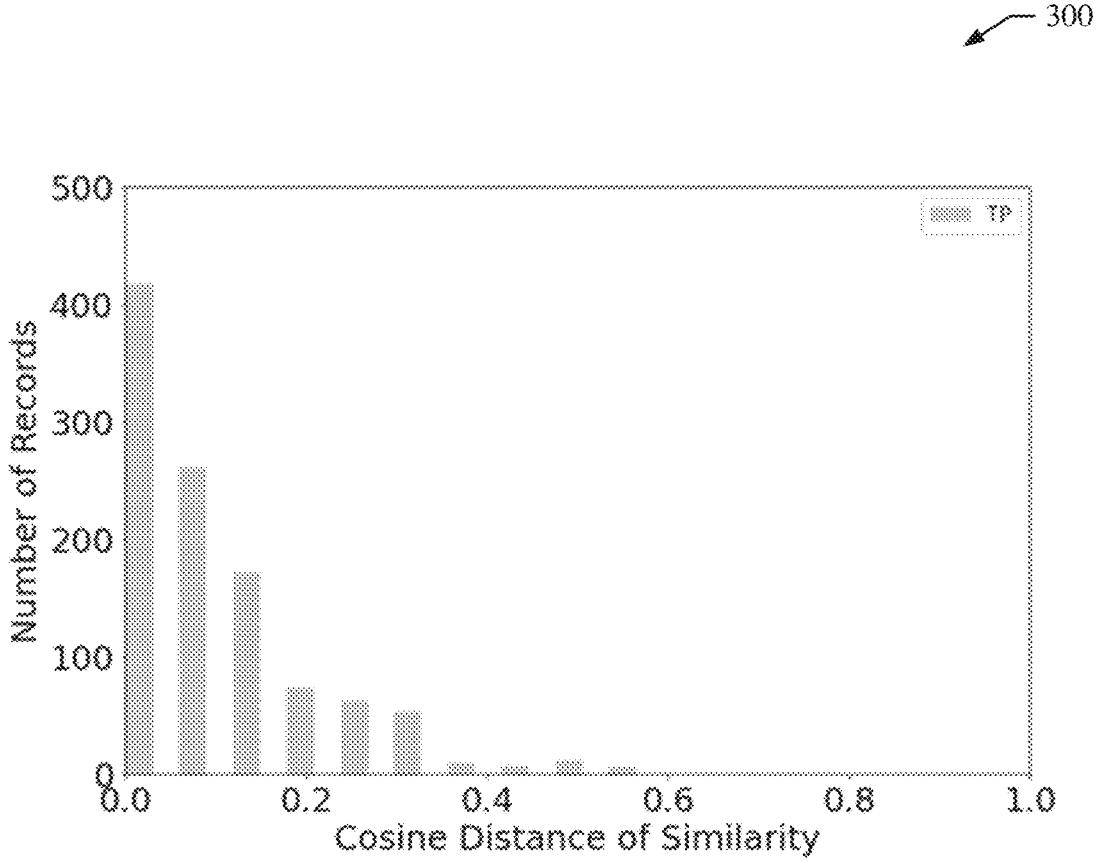
FIG. 3 shows an illustrative chart depicting the comprehensiveness of synthetic labels measured by the distance of cosine similarity.

FIG. 3, by way of example, illustrates a true positive chart 300 depicting the comprehensiveness of synthetic labels measured by the distance of cosine similarity. The true positive chart 300 illustrates how many synthesized samples are generated per bin (cosine distance of similarity) and shows that more synthetic sentences are generated with smaller cosine distances, i.e., greater similarity to the original sentence.

With the use of a comprehensive labeled set of utterances generated synthetically using, e.g. framework 200, a trained model may be more accurate and effective than a model trained using a sparse dataset. For example, with a sparse label set with a total of 20 natural language labels created manually or conventional labeling techniques for both training and validation, a model may overfit for the training labels. Accordingly, a model trained in a sparse dataset may have limited performance as it will be unstable, e.g., performance may depend on how the sparse dataset is split between training and validation. Further, the recall rate, i.e., the number of true positives captured, for a model trained with a sparse dataset may be relatively low, e.g., below 40%. In contrast, with a comprehensive labeled set of utterances with 1075 synthetic labels generated using the 20 natural language labels as input utterances, as discussed herein, a random split of the labels may be used for training and validation datasets. Further, after training, the performance of the trained model is much more reliable and repeatable and may achieve a significantly greater recall rate. Accordingly, by generating synthetic utterances as described herein, comprehensive training sets may be quickly and inexpensively generated which may be used to train a reliable and solid model based on an extremely small amount of natural language labels.

Figure 4:
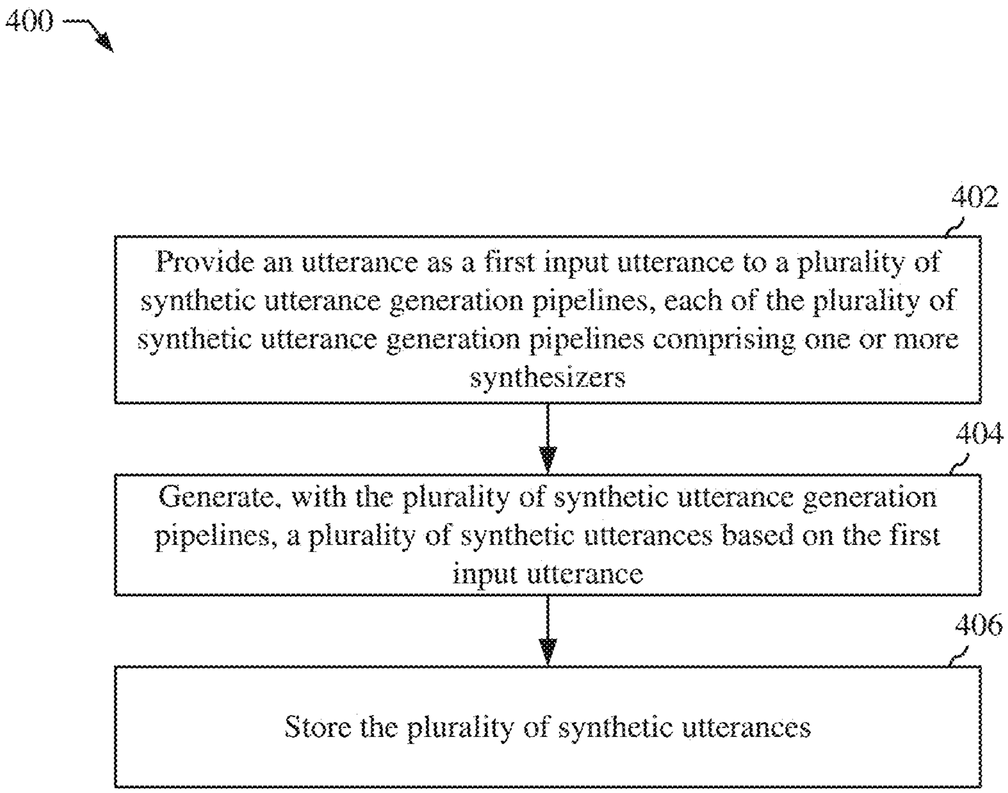
FIG. 4 shows an illustrative flowchart depicting an example operation for generating synthetic utterances, according to some implementations.

FIG. 4 shows an illustrative flowchart depicting an example operation 400 for generating synthetic utterances, according to some implementations. The example operation 400 is described as being performed by the system 100, such as by the one or more processors 130 executing instructions to perform operations associated with the components 140 and 150 and described in reference to framework 200.

At 402, an utterance is provided to the system 100 as a first input utterance to a plurality of synthetic utterance generation pipelines, each of the plurality of synthetic utterance generation pipelines may include one or more synthesizers. For example, the utterance provided to the system 100 may be a natural language utterance, such as utterance 202, or a synthetic utterance 204, as illustrated in FIG. 2. The plurality of synthetic utterance generation pipelines may be two or more of the synthetic utterance generation pipelines 220 and the one or more synthesizers may be any of synthesizers 230A and 230C and synthesizer chain 230B, including synthesizer 230B1 and synthesizer 230B2 coupled together in series. In some implementations, at least one of the synthetic utterance generation pipelines may include a plurality of different synthesizers coupled in series, e.g., as illustrated by synthesizer chain 230B, including synthesizer 230B1 and synthesizer 230B2. In some implementations, the plurality of synthetic utterance generation pipelines may include at least three synthetic utterance generation pipelines, e.g., as illustrated by synthetic utterance generation pipelines 220A, 220B, and 220C.

At 404, the system 100 generates, with the plurality of synthetic utterance generation pipelines, a plurality of synthetic utterances based on the first input utterance. For example, as discussed above, each of the synthetic utterance generation pipelines 220 may produce a respective synthetic utterance based on the input utterance. For example, in some implementations, the one or more synthesizers in each of the plurality of synthetic utterance generation pipelines may include Text2Text machine learning (ML) models, and the synthetic utterance may be generated using the Text2Text ML model based on the input utterance.

At 406, the system 100 stores the plurality of synthetic utterances. For example, as illustrated in framework 200, the synthetic utterances produced by each synthetic utterance generation pipeline 220 may be stored in a synthesized utterance database 250, e.g., in database 120 in system 100. The synthetic utterances may be labeled based on the label associated with the original input utterance.

In some implementations, the system 100 may further evaluate a similarity between the first input utterance and each synthetic utterance produced by each of the plurality of synthetic utterance generation pipelines, wherein each synthetic utterance is stored if the similarity is less than a predetermined threshold. For example, the similarity between the first input utterance and each synthetic utterance may be evaluated by the synthetic utterance evaluation 240 in framework 200, e.g., synthetic utterance evaluator 150, illustrated in FIG. 1, and a synthetic utterance is provided to the synthesized utterance database 250 if the evaluated similarity is less than a predetermined threshold. In some implementations, the similarity between the first input utterance and each synthetic utterance may be evaluated using a cosine similarity. In some implementations, the similarity is evaluated by encoding the first input utterance and each synthetic utterance into two separate vectors and determining a cosine distance between the two separate vectors. The system 100 may compare the cosine distance between the two separate vectors to the predetermined threshold. In some implementations, the system 100 provides each synthetic utterance as a new input utterance to one or more of the synthetic utterance generation pipelines if the similarity is less than the predetermined threshold. For example, a synthetic utterance 204 output by a synthetic utterance generation pipeline 220 may be provided as the input utterance 210 in a feedback loop. In some implementations, each synthetic utterance produced by a synthetic utterance generation pipeline is provided as the new input utterance to a different synthetic utterance generation pipeline. In some implementations, each synthetic utterance produced by a synthetic utterance generation pipeline is provided as the new input utterance to all of the synthetic utterance generation pipelines. Additionally, the system 100 may repeat a feedback loop until a predetermined number of synthetic utterances are produced, wherein the feedback loop comprises storing each new synthetic utterance generated by the one or more synthetic utterance generation pipelines based on the new input utterance and providing each new synthetic utterance as the new input utterance to the one or more synthetic utterance generation pipelines.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method for generating synthetic utterances, comprising:

providing a same utterance as a first input utterance to each synthetic utterance generation pipeline of a plurality of synthetic utterance generation pipelines operating in parallel, each synthetic utterance generation pipeline of the plurality of synthetic utterance generation pipelines comprising one or more synthesizers;

generating, with the plurality of synthetic utterance generation pipelines, a plurality of synthetic utterances based on the first input utterance; and storing at least one synthetic utterance of the plurality of synthetic utterances.

2. The method of claim 1, further comprising:

evaluating a similarity between the first input utterance and each synthetic utterance produced by each synthetic utterance generation pipeline of the plurality of synthetic utterance generation pipelines, wherein each synthetic utterance is stored if the similarity is less than a predetermined threshold.

3. The method of claim 2, wherein evaluating the similarity comprises:

encoding the first input utterance and each synthetic utterance into two separate vectors;

determining a cosine distance between the two separate vectors; and comparing the cosine distance between the two separate vectors to the predetermined threshold.

4. The method of claim 2, further comprising providing each synthetic utterance as a new input utterance to one or more synthetic utterance generation pipelines of the plurality of synthetic utterance generation pipelines if the similarity is less than the predetermined threshold.

5. The method of claim 4, wherein each synthetic utterance produced by a synthetic utterance generation pipeline is provided as the new input utterance to a different synthetic utterance generation pipeline.

6. The method of claim 4, further comprising repeating a feedback loop until a predetermined number of synthetic utterances are produced, wherein the feedback loop comprises storing each new synthetic utterance generated by the one or more synthetic utterance generation pipelines based on the new input utterance and providing each new synthetic utterance as the new input utterance to the one or more synthetic utterance generation pipelines.

7. The method of claim 1, where the one or more synthesizers in each synthetic utterance generation pipeline of the plurality of synthetic utterance generation pipelines comprise Text2Text machine learning (ML) models.

8. The method of claim 1, wherein at least one synthetic utterance generation pipeline of the plurality of synthetic utterance generation pipelines comprises a plurality of different synthesizers coupled in series.

9. The method of claim 1, wherein the plurality of synthetic utterance generation pipelines comprises at least three synthetic utterance generation pipelines.

10. A system for generating synthetic utterances, comprising:

one or more processors; and a memory coupled to the one or more processors and storing instructions that, when executed by the one or more processors, cause the system to perform operations comprising:

provide a same utterance as a first input utterance to each synthetic utterance generation pipeline of a plurality of synthetic utterance generation pipelines operating in parallel, each synthetic utterance generation pipeline of the plurality of synthetic utterance generation pipelines comprising one or more synthesizers;

generate, with the plurality of synthetic utterance generation pipelines, a plurality of synthetic utterances based on the first input utterance; and store at least one synthetic utterance of the plurality of synthetic utterances.

11. The system of claim 10, wherein execution of the instructions causes the system to perform operations further comprising:

evaluate a similarity between the first input utterance and each synthetic utterance produced by each synthetic utterance generation pipeline of the plurality of synthetic utterance generation pipelines, wherein each synthetic utterance is stored if the similarity is less than a predetermined threshold.

12. The system of claim 11, wherein the system is configured to evaluate the similarity by being configured to:

encode the first input utterance and each synthetic utterance into two separate vectors;

determine a cosine distance between the two separate vectors; and compare the cosine distance between the two separate vectors to the predetermined threshold.

13. The system of claim 11, wherein execution of the instructions causes the system to perform operations further comprising provide each synthetic utterance as a new input utterance to one or more synthetic utterance generation pipelines of the plurality of synthetic utterance generation pipelines if the similarity is less than the predetermined threshold.

14. The system of claim 13, wherein each synthetic utterance produced by a synthetic utterance generation pipeline is provided as the new input utterance to a different synthetic utterance generation pipeline.

15. The system of claim 13, wherein execution of the instructions causes the system to perform operations further comprising repeat a feedback loop until a predetermined number of synthetic utterances are produced, wherein the feedback loop comprises store each new synthetic utterance generated by the one or more synthetic utterance generation pipelines based on the new input utterance and provide each new synthetic utterance as the new input utterance to the one or more synthetic utterance generation pipelines.

16. The system of claim 10, where the one or more synthesizers in each synthetic utterance generation pipeline of the plurality of synthetic utterance generation pipelines comprise Text2Text machine learning (ML) models.

17. The system of claim 10, wherein at least one synthetic utterance generation pipeline of the plurality of synthetic utterance generation pipelines comprises a plurality of different synthesizers coupled in series.

18. The system of claim 10, wherein the plurality of synthetic utterance generation pipelines comprises at least three synthetic utterance generation pipelines.

* * * * *